US008863276B2

(12) United States Patent
Giblin et al.

(10) Patent No.: US 8,863,276 B2
(45) Date of Patent: Oct. 14, 2014

(54) AUTOMATED ROLE ADJUSTMENT IN A COMPUTER SYSTEM

(71) Applicant: International Business Machines Corporation, Armonk, NY (US)

(72) Inventors: Christopher J. Giblin, Zurich (CH); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 57 days.

(21) Appl. No.: 13/755,646

(22) Filed: Jan. 31, 2013

(65) Prior Publication Data

US 2014/0215603 A1   Jul. 31, 2014

(51) Int. Cl.
| G06F 21/00 | (2013.01) |
| G06F 11/34 | (2006.01) |
| G06F 11/32 | (2006.01) |
| G06F 21/57 | (2013.01) |

(52) U.S. Cl.
CPC ............ *G06F 21/57* (2013.01); *G06F 11/3438* (2013.01); *G06F 11/328* (2013.01)
USPC .................... 726/21; 726/27; 726/28

(58) Field of Classification Search
CPC .............. G06F 11/328; G06F 11/3438; G06F 17/30522; G06F 21/57
USPC ................................................ 726/21, 27, 28
See application file for complete search history.

(56) References Cited

U.S. PATENT DOCUMENTS

| 6,275,825 B1 | 8/2001 | Kobayashi et al. | |
| 7,752,652 B2 * | 7/2010 | Prokupets et al. | ................ 726/2 |
| 7,865,959 B1 | 1/2011 | Lewis | |
| 7,882,212 B1 * | 2/2011 | Nappier et al. | ................ 709/224 |
| 7,933,925 B2 | 4/2011 | Sreedhar | |
| 2003/0065942 A1 * | 4/2003 | Lineman et al. | ............... 713/201 |
| 2004/0162905 A1 | 8/2004 | Griffin et al. | |
| 2007/0282841 A1 * | 12/2007 | Sreedhar | ........................... 707/9 |
| 2008/0186912 A1 * | 8/2008 | Huomo | ......................... 370/329 |
| 2010/0325697 A1 * | 12/2010 | Terzis et al. | ....................... 726/3 |
| 2012/0195222 A1 | 8/2012 | Raleigh | |
| 2014/0215604 A1 | 7/2014 | Giblin et al. | |

OTHER PUBLICATIONS

Kamra et al., "Detecting Anomalous Access Patterns in Relational Databases," The VLDB Journal, vol. 17, No. 5, Aug. 2008, pp. 1063-1077.

Bauer et al., "Detecting and Resolving Policy Misconfigurations in Access-Control Systems," Proceedings of the 13th ACM Symposium on Access Control Models and Technologies (SACMAT '08), Jun. 2008, pp. 185-194.

(Continued)

*Primary Examiner* — Chau Le

(74) *Attorney, Agent, or Firm* — Yee & Associates, P.C.; Louis J. Percello

(57) ABSTRACT

An embodiment of the invention is associated with a system having a role for controlling user access, the role comprising users, permissions, and a set of rules. The embodiment records each of a succession of access events in an access log, each event comprising an instance of the system being accessed by a user. The embodiment further analyzes recorded access events in the access log at selected time intervals, to detect a condition or violation of rules of the set of rules. Responsive to detecting a condition or violation, the embodiment selectively determines whether any change to the users or permissions of a specified role is needed. Each needed change is then implemented.

14 Claims, 9 Drawing Sheets

(56) References Cited

OTHER PUBLICATIONS

Ni et al., "Automating Role-based Provisioning by Learning from Examples," Proceedings of the 14th ACM Symposium on Access Control Models and Technologies (SACMAT '09), Jun. 2009, pp. 75-84.

Hu et al., "Towards automatic update of access control policy", Proceedings of the 24th International Conference on Large Installation System Administration (LISA '10), Nov. 2010, 15 pages.

"IBM Tivoli Compliance Insight Manager," accessed Jan. 25, 2013, 2 pages. www-01.ibm.com/software/tivoli/products/compliance-insight-mgr/.

\* cited by examiner

FIG. 9
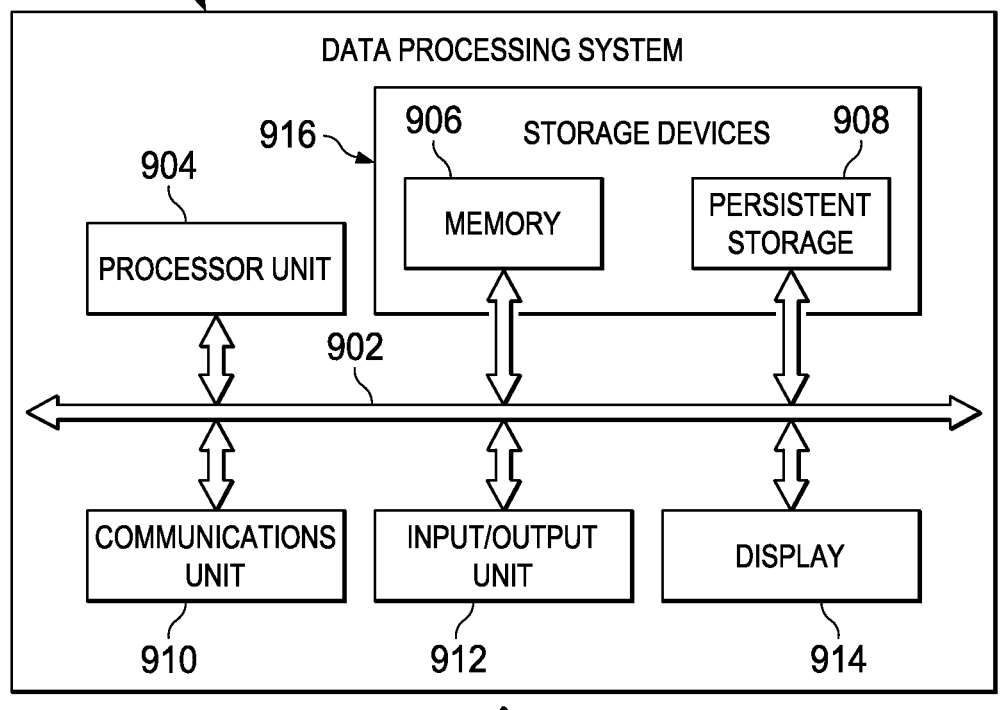
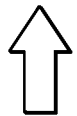
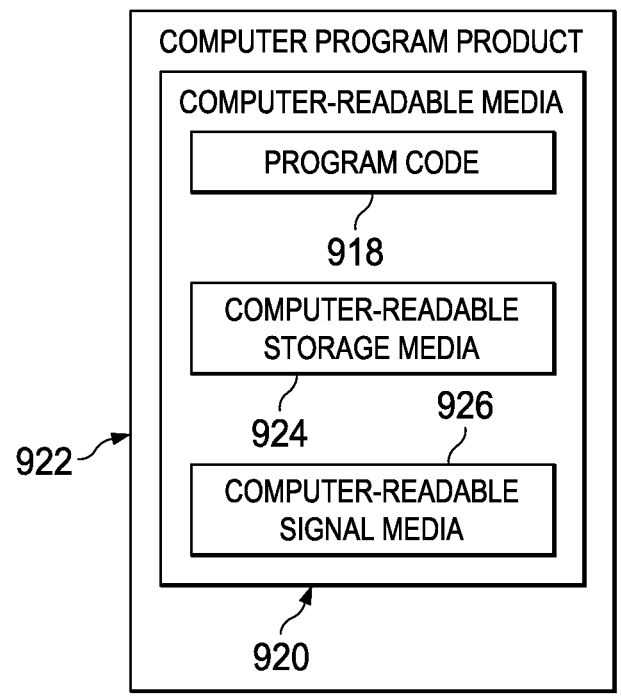

AUTOMATED ROLE ADJUSTMENT IN A COMPUTER SYSTEM

BACKGROUND

1. Field

The invention disclosed and claimed herein generally pertains to a system and method for automated adjustment of roles used to control or regulate computer system access. More particularly, the invention pertains to a system and method of the above type wherein an access log is maintained, and is periodically or aperiodically used in determining whether a particular role needs to be refined or adjusted.

2. Description of the Related Art

Inaccurate, obsolete or overly generous (or overly provisioned) authorizations to access a computer system can create significant security risks. Such authorizations can possibly cause malicious data leakage or program execution. In an ideal arrangement, only those users who have a current business requirement to access a given set of resources should possess the respective authorizations which allow them to do so. However, maintaining precise authorizations, particularly in very large IT environments comprising millions of users and permissions, exceeds the capacity of many manual or semi-automated security processes that are currently being used.

Role-based access control (RBAC) is an access policy which is presently used in commercial and other applications and systems. Access in RBAC is controlled at the system level, outside of the user's control. An RBAC configuration controls collections of permissions that may include complex operations, such as e—commerce transactions, but may also control simple operations, such as read or write operations. A role in RBAC generally comprises a set of permissions and a set of users.

While proper RBAC roles match a job function, and job functions typically change only slowly over time, ongoing changes still do occur in both the Information Technology (IT) environment and the personnel of an organization. For example, servers can be decommissioned and new servers can be added or introduced. Organization employees come and go. These natural changes are likely to result in RBAC states becoming obsolete or non-optimal, over time. Accordingly, in order to account for these changes, roles that are initially defined and deployed in an RBAC system should thereafter be assessed and certified, at specified time intervals. Any needed changes to the role structure would also need to be approved.

At present, role certifications tend to be time-consuming and tedious for approvers. Also, roles frequently have excessive access privileges, and the human eye generally does not detect "drift", or unused permissions and dormant users. Moreover, it is anticipated that future access control systems will increasingly rely on analytical capabilities.

SUMMARY

Embodiments of the invention provide a method, system and computer program product for monitoring the constituent parts of a role of the above type, i.e., role users and role permissions, with regard to recent or current usage. This monitoring effort determines a need for role improvements, which may either be performed directly by the monitor, or proposed to an administrator in the form of a warning or recommendation. Thus, these embodiments allow roles to be automatically adapted and refined over time, resulting in lower administrative costs, improved security and reduced audit failures.

An embodiment of the invention directed to a computer implemented method is associated with a computer system wherein a specified role controls user access, the specified role comprises one or more users and one or more permissions, and a set of prespecified rules pertains to the specified role. The method includes the step of recording access data pertaining to each of a succession of access events in an access log, wherein each event comprises an instance of the computer system being accessed by a particular user. The method further includes analyzing recorded data contained in the access log at selected time intervals, in order to detect one of a plurality of prespecified conditions. Responsive to detecting a prespecified condition, the method selectively determines whether any change to the users or to the permissions of the specified role is needed. The method further includes implementing each needed change to the users or to the permissions.

BRIEF DESCRIPTION OF THE SEVERAL VIEWS OF THE DRAWINGS

FIG. 9 is a block diagram showing a computer or data processing system that may be used in implementing embodiments of the invention.

DETAILED DESCRIPTION

Figure 1:
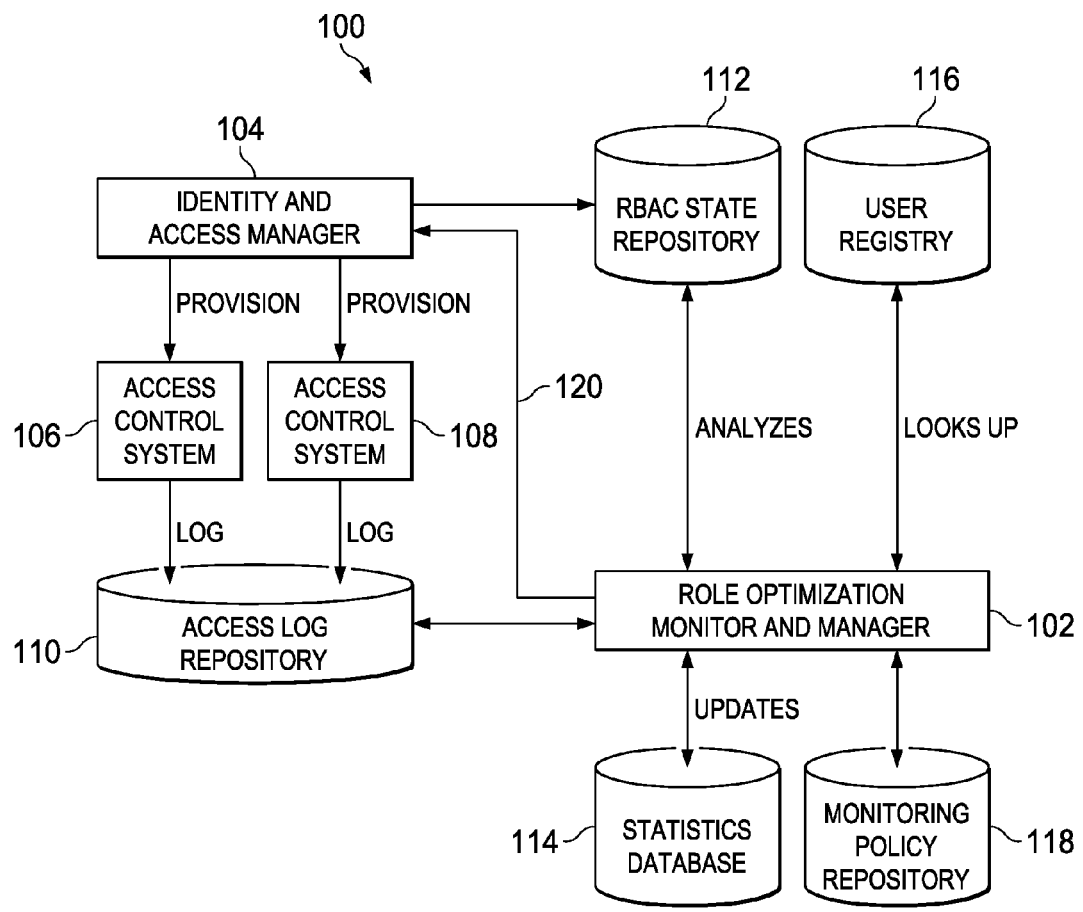
FIG. 1 is a block diagram showing components configured for implementing an embodiment of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring to FIG. 1, there is shown a system 100 comprising an embodiment of the invention. System 100 includes a role optimization monitor and management component 102, also referred to herein as a role optimization manager (ROMM) for convenience. ROMM 102 directs or manages a process carried out by system 100 that automatically reduces the administrative burden of maintaining and updating security roles required for one or more computer systems, wherein the roles are provided or defined in accordance with an RBAC policy. ROMM 102 also monitors the usage of users and permissions associated with such roles, at prespecified time intervals.

More particularly, the process of system 100 enables respective roles to be tuned, in order to authorize only the least or minimum access privileges that are required for operation of a given computer system, or access control system. System 100 also notifies administrators of role drift, or changes that impact role quality, and proposes modifications in response to the role drift. Moreover, system 100 provides a platform for collecting and using relevant statistical data, as described hereinafter in further detail.

Referring further to FIG. 1, there is shown an identity and access management component 104. This component enables a user to log into each of two or more disparate computer systems, wherein access is authorized in accordance with the RBAC policy. Thus, the user can access a system, if she or he is included in a role that provides permission for such access. Access control systems 106 and 108 exemplify different computer systems, wherein system access roles and permissions are furnished or provisioned to users by access management component 104.

FIG. 1 further shows an access log repository 110, which contains an access event log for each access control system such as system 106 or 108. Whenever one of these systems is accessed by a user, based on a permission provided by a role, certain information is entered into the access event log for that system or resource. The entered information can include a timestamp at the beginning of the access event, and the identity of the user. Further information may include the associated system and resource, the status thereof and the action taken.

In addition to resource access events, log repository 110 contains a historical record showing the activations of respective roles and permissions, which are authorized by the RBAC policy. Recorded role activation data may include activation timestamp, user, role and permission identities, the associated access control system, and termination timestamp. Access log repository 110 performs the further function of aggregating log data from a multitude of access control systems.

In carrying out its objectives as described above, system 100 more particularly identifies certain conditions. System 100 also proposes or performs tasks to address these conditions, in order to improve role quality. These conditions may include, without limitation, (1) Valid and Dormant users, (2) Superfluous permissions, (3) Role size, (4) Dormant roles, (5) Role risk, (6) Role concurrency, and (7) permission-based separation of duties. These conditions are respectively defined as follows:

(1) Valid and Dormant users: users who are either no longer valid (e.g., lack employee verification) or have not activated a role for a time interval are candidates for being removed from the role or being assigned a new role, possibly arranged in an inheritance relationship with the original role.

(2) Superfluous permissions: permissions may not have been exercised for a given time and thus represent excessive privilege. Such permissions should be removed from the role or a new role should be created and arranged in an inheritance hierarchy with the original one.

(3) Role size: identify roles exceeding lower or upper bounds for the cardinality of users or permissions as per best practice, often referred to as cardinality constraints.

(4) Dormant roles: roles which have not been activated for a given time interval. Dormant roles are a special case of dormant users, where all role members are dormant.

(5) Role risk: if metadata is available about the sensitivity of the resources being accessed, the role can be evaluated with regards to the consistency of its permissions, e.g., highly sensitive resources may belong in a separate role instead of being mixed in the same role with low-sensitivity permissions.

(6) Role concurrency: The maximum number of concurrent sessions for a role. Identifying the maximum number of concurrent role sessions helps to define cardinality constraints supported by some RBAC systems.

(7) Permission-based separation of duties: Given sets of permissions which should be mutually exclusive, identify accesses where users each accessed sets of one or more mutually exclusive permissions. This is helpful for RBAC environments which support only user-based separation In order to accomplish its respective tasks, FIG. 1 further shows system 100 provided with an RBAC state repository 112, a statistics database 114, a user registry 116, and a monitoring policy repository 118. Repository 112 provides a location for storing current data pertaining to the roles and permissions assigned to users of respective access control systems, such as systems 106 and 108, in accordance with the RBAC policy.

In its operation, ROMM 102 exchanges information with repositories 110, 112 and 118, and also with registry 116. ROMM 102 uses such information to modify and refine roles over time. ROMM 102 also provides information pertaining to certain roles to access management component 104, such as recommendations, warnings, notifications and updates in regard thereto, over a link 120.

As ROMM 102 processes data pertaining to respective roles, statistical data for further role analysis is collected and updated in statistics database 114. Examples of such statistical data include but are not limited to usage frequencies, role activations, permissions accessed and role size. The statistics database provides measures for specified analytics applications, exemplified by applications for reports, machine learning, IT security risks and OLAP multidimensional visualization.

User registry 116 provides a list of users of systems such as systems 106 and 108. Repository 118 contains policies pertaining to the operation of ROMM 102.

Figure 2:
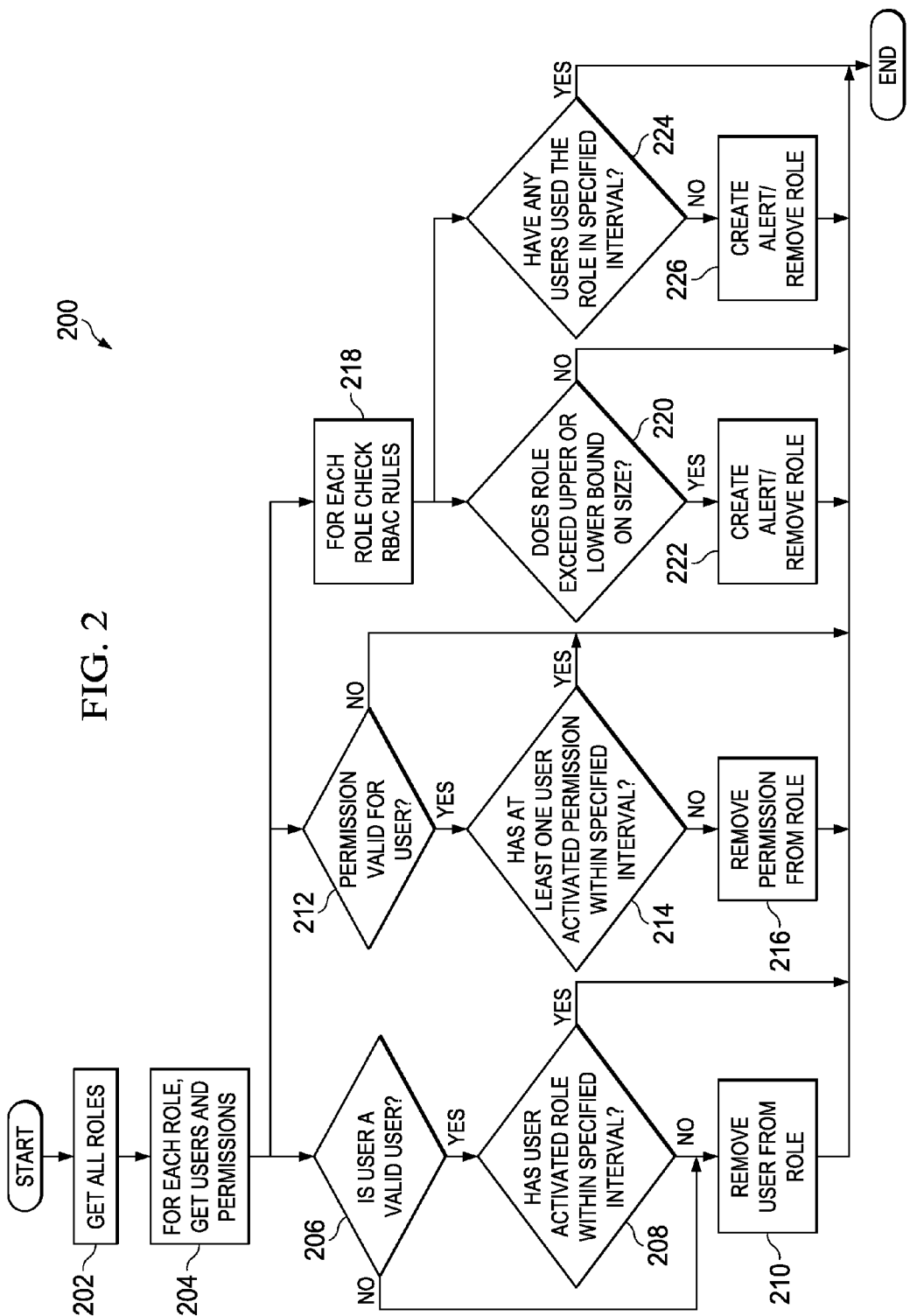
FIG. 2 comprises a flowchart showing steps for a method comprising an embodiment of the invention.

Referring to FIG. 2, there is shown a flowchart that includes steps for a method comprising an embodiment of the invention. More particularly, the flowchart of FIG. 2 is directed to assessing the conditions (1)-(4) described above, in connection with a system using an RBAC policy for access security, and for implementing corrections found to be necessary. Steps of FIG. 2 may be carried out by ROMM 102 and other components of system 100, but embodiments of the invention are not limited thereto.

Upon starting the method of FIG. 2, information pertaining to each of the roles of the particular policy is acquired at step 202. Such information could, for example, be obtained by ROMM 102 by accessing RBAC state repository 112 and user registry 116 of FIG. 1. At step 204 the users and permissions for each acquired role are specified.

Steps 206, 208 and 210 are provided to monitor the above condition (1), that is, to determine whether there are any valid and dormant users, and if so to analyze them. At step 206 each user identified at step 204 for a given role is analyzed, to decide if the user is a valid user. For example, the user's position in an associated organization, as shown by registry 116 or the like, could be queried. The position information, together with pertinent RBAC policy, may then be used to indicate whether the user is or is not a valid user for the given role. If so, the method proceeds to step 208, and otherwise, if the user is not a valid user, the method proceeds to step 210. At step 210 the user is removed from the given role.

Step 208 of FIG. 2 is a decision step that determines if the user has activated the given role within a specified time interval. In order to make this determination, information could be obtained from the appropriate event access log, such as an access log contained in repository 110. Useful information from the log could include, for example, data identifying the user and associated systems and actions, and timestamp information.

If it is determined at step 208 that the user has activated the given role at some time within the specified interval, the method of FIG. 2 ends, without further action. However, if the user has not activated the given role within the interval, it is concluded that the user is a dormant user. Accordingly, the method proceeds to step 210, and the user is removed from the given role.

Steps 212, 214 and 216 pertain to the above condition that a given permission granted to users of a role is superfluous or unnecessary for that role. At step 212, rules pertaining to the pertinent RBAC policy are considered, in order to confirm that the given permission is valid for a particular user of the role. If step 212 is affirmative, the method proceeds to step 214, and otherwise ends for the particular user.

Step 214 of FIG. 2 is a decision step that determines if at least a prespecified minimum number of activations of the given permission have occurred within a prespecified time. The minimum number could be only one. In order to make this determination, information is usefully obtained from the appropriate event access log, such as an access log contained in repository 110. Useful information from the log would include, for example, data identifying users and associated systems and actions, and timestamp information.

If it is determined at step 214 that at least the minimum number of user activated permissions have occurred within the prespecified interval, the method of FIG. 2 ends, without further action. However, if at least the minimum number of activations have not occurred, it is determined that the given permission is a superfluous permission. Accordingly, the method proceeds to step 216, and the given permission is removed from the role.

Referring further to FIG. 2, at step 218 the rules for RBAC policy pertaining to each respective role is checked or considered, in regard to condition (3) pertaining to role size, and to condition (4) pertaining to dormant roles. Decision step 220 then queries whether the size of a given role exceeds either a prespecified upper bound or lower bound. If not, the method of FIG. 2 ends, and no further action is taken with respect to the given role. If either bound is exceeded, the method proceeds to step 222. At this step, action is taken, such as to alert a system administrator to the situation, or to remove the given role as a tool for accessing respective systems.

Step 224 is provided to determine whether a given role has become a dormant role. More particularly, step 224 queries whether any user has used the given role during a prespecified time interval. If the answer to this query is affirmative, the method of FIG. 2 ends, and no further action is taken with respect to the given role. If the answer is negative, the given role is considered to be dormant, and the method proceeds to step 226. At this step, action is taken, such as to alert a system administrator to the situation, or to remove the given role as a tool for accessing respective systems.

It is anticipated that monitoring and adjustment steps of FIG. 2 pertaining to the conditions (1)-(4), respectively, can each be carried out at predetermined intervals of time which may be periodic, or may be aperiodic. By doing this, the status and conditions of respective roles will be continually monitored over time. This will enable changed role conditions to be detected and then responded to, with minimal delay. This, in turn, will enhance system security.

Figure 3:
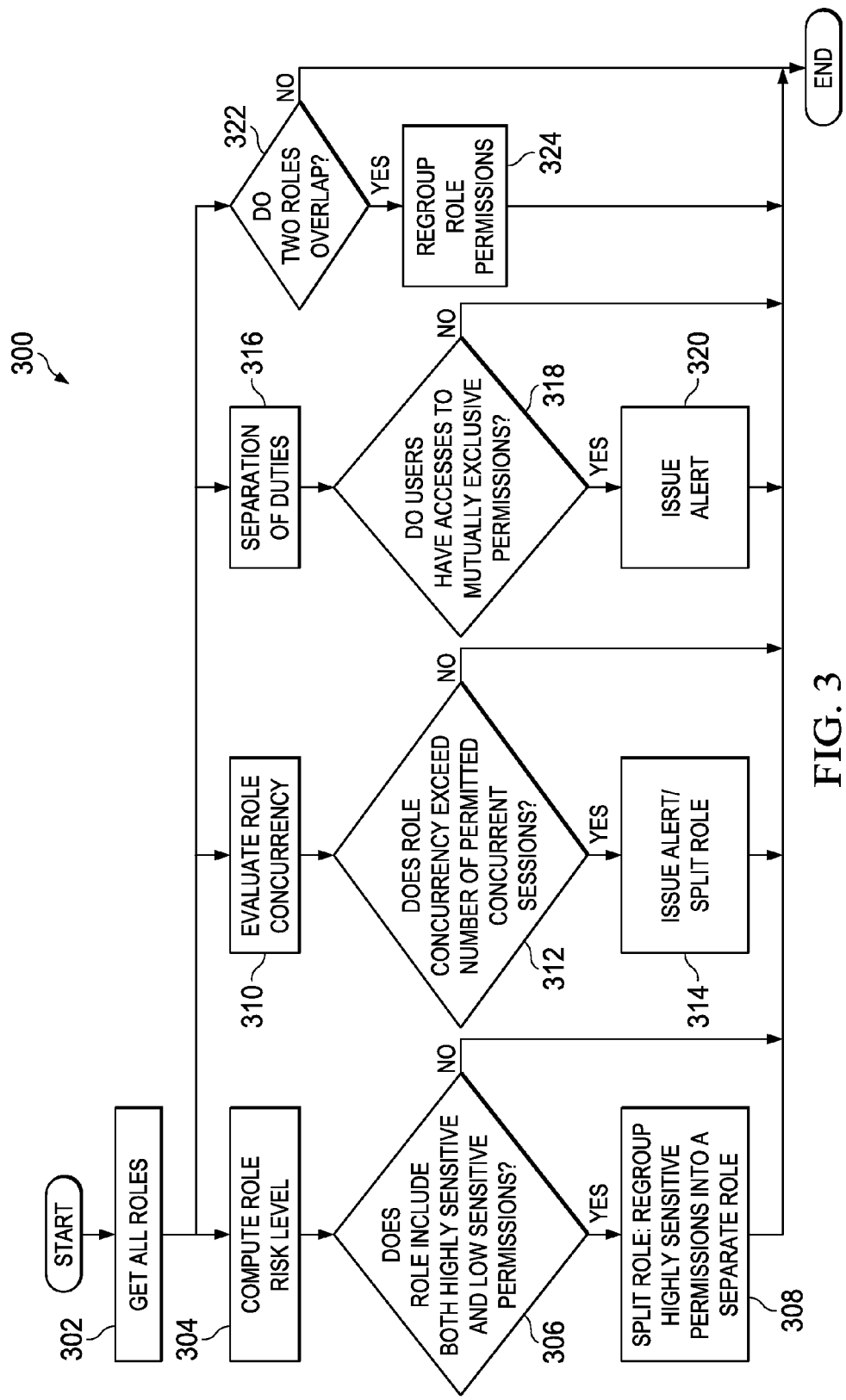
FIG. 3 comprises a flowchart showing further steps for a method comprising an embodiment of the invention.

Referring to FIG. 3, there is shown a flowchart directed to assessing the conditions (5)-(7) described above, in connection with a system using a particular RBAC policy for assessing security, and for implementing corrections found to be necessary. FIG. 3 also shows steps for monitoring the system to detect a condition wherein two roles overlap. Steps of FIG. 3 may be carried out by ROMM 102 and other components of system 100, in like manner with FIG. 2, but embodiments of the invention are not limited thereto.

Upon starting the method of FIG. 3, information pertaining to each of the roles of the particular RBAC policy is acquired at step 302. Such information could, for example, be obtained by ROMM 102 by accessing RBAC state repository 112 and policy repository 118 of FIG. 1.

Steps 304, 306 and 308 are provided to monitor the above condition (5), pertaining to role risk, and to take any action required. At step 304, the method of FIG. 3 computes role risk level. More particularly, for each role the sensitivity level of each permission of the role is evaluated. Each evaluated permission is then rated to be either of high sensitivity or low sensitivity.

At decision step 306, it is determined whether or not a role includes both highly sensitive and low sensitive permissions. If not, the method ends. Otherwise, the method proceeds to step 308, wherein the highly sensitive permissions are grouped into a role which is separated from the role that includes all of the low sensitive permissions.

Steps 310, 312 and 314 monitor role concurrency at prespecified intervals, to detect any violations in regard thereto. Role concurrency refers to session events, wherein two or more users included in a given role each accesses the same system or resource at the same time. Accordingly, at each prespecified monitoring interval information contained in access log repository 110 or the like is accessed at step 310. The accessed information is then used to identify each role concurrency session that has occurred since the last monitoring interval.

At decision step 312, a query is made to determine whether the number of identified concurrency sessions has exceeded the maximum number of such sessions permitted by the pertinent RBAC policy. If not, the method ends. However, if the query of decision step 312 is positive the method proceeds to step 314, which takes certain action. One action would be to issue an alert of the situation to the system administrator. Another action would be to split the given role into multiple roles, so that each of such roles would have fewer users. This would act to reduce the number of concurrency sessions that would occur thereafter.

Steps 316, 318 and 320 pertain to the above condition (7), regarding permission—based separation of duties. At step 316, RBAC policy is analyzed to identify certain types of duties which require separation from other types of duties. Clearly, a user having a set of permissions to perform duties of the first type should not also have a set of permissions to perform duties of the second type. Accordingly, decision step 318 determines whether or not there are any users in a given role who have access to mutually exclusive permissions. If not, the method ends. Otherwise, the method proceeds to step 320, to issue an alert to the system administrator.

Steps 322 and 324 are directed to the condition of overlapping roles. Roles overlap one another if they both grant the same permissions to the same users. At predetermined time intervals, step 322 determines whether or not this condition exists. If not, the method ends. Otherwise, the method proceeds to step 324, wherein role permissions are selectively regrouped, in order to discontinue the overlap condition.

It is anticipated that monitoring and adjustment steps of FIG. 3 pertaining to respective conditions thereof can each be carried out at predetermined intervals of time, which may be periodic, or may be aperiodic. By doing this, the status and conditions of respective roles will be continually monitored over time. This will enable changed role conditions to be detected and then responded to, with minimal delay. This, in turn, will enhance system security.

Figure 4:
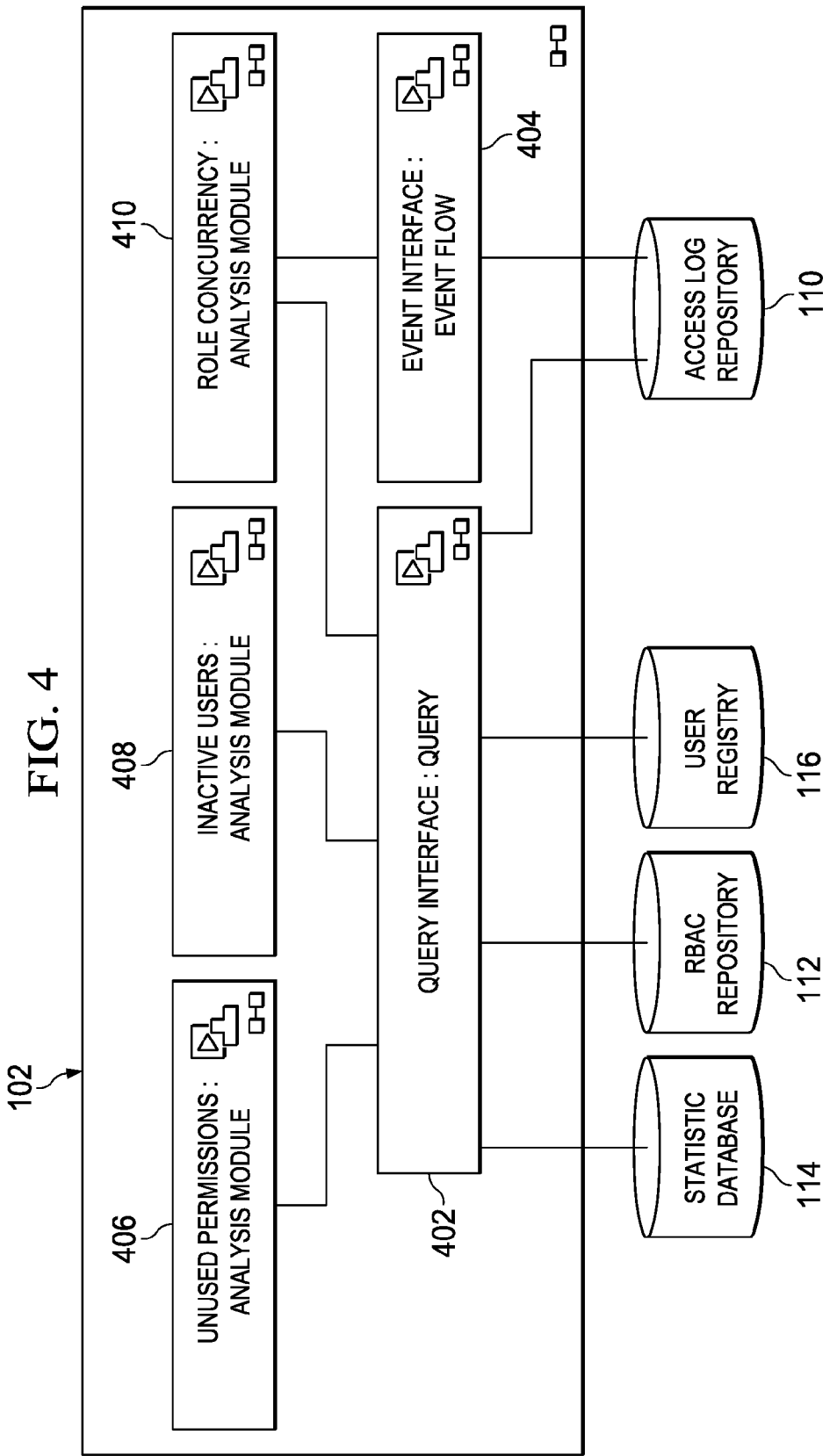
FIG. 4 is a block diagram showing certain components of FIG. 1 in further detail.

Referring to FIG. 4, there is shown ROMM 102 in further detail. ROMM 102 includes a data access layer that has a query interface 402, wherein the interface 402 is connected to exchange data with statistics database 114, RBAC repository 112, user registry 116, and access log repository 110. The data access layer of ROMM 102 further includes an event interface 404, connected to exchange data with access log repository 110. Thus, the data access layer is configured to support query models, and also event flow models such as playback.

Each analysis function carried out by ROMM 102 is usefully implemented in a separate analysis module. Respective modules may be plugged into the data access layer, to support a variety of analysis components. Also, new analysis modules can easily be added to the system. FIG. 4 shows exemplary analysis modules 406, 408 and 410, which are respectively connected to interfaces 402 and 404 as shown. Analysis module 406 pertains to the unused permissions condition, analysis module 408 pertains to inactive users, and analysis module 410 pertains to role concurrency.

In carrying out role analysis in regard to certain conditions of the type described above, ROMM 102 enumerates all of such roles and visits each one. Each pertinent analysis module is invoked during the visit, and role relationships are visible to the modules. Role analysis is usefully employed to analyze conditions such as role size, dormant users and unused permissions, as described above in connection with FIG. 2.

For event analysis, analysis modules subscribe to the flow of events. More particularly, events stored in access log repository 110 are played back through the event analysis modules. Event playback enables observation of dynamic runtime properties, which can be used to detect role concurrency and dynamic separation of duty violations. Detecting role concurrency enables concurrency parameters to be tuned to the most optimal levels. Unwanted concurrent role activations can also be detected, so that appropriate action may be taken.

Figure 5:
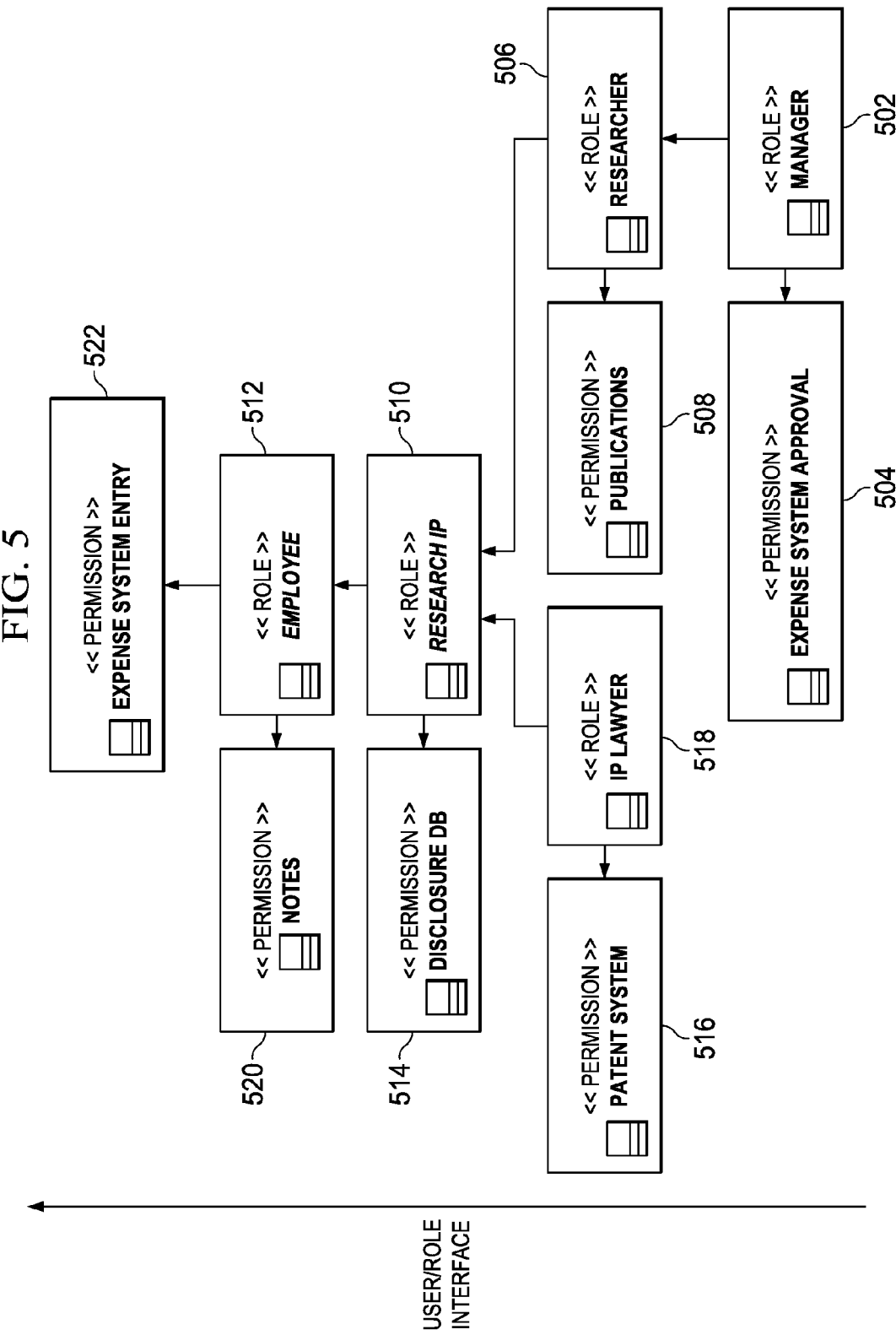
FIG. 5 is a schematic diagram illustrating role hierarchies.

Referring to FIG. 5, there is shown a hierarchy of roles, which is a feature or characteristic of an RBAC control arrangement. FIG. 5 more particularly shows a number of exemplary users, or user positions 502-522, of respective types that are common to business and other organizations. Each user or user position 502-522 could refer to a particular function, or to a person tasked to carry out the particular function.

In accordance with RBAC, a role at one of the users of FIG. 5 could be acquired or inherited from a superior role. As an example, the role of the researcher 506 is shown to be inherited from the role of manager 502. Thus, the manager role 502 is superior to the researcher role 506.

Moreover, a user or user position can inherit multiple roles. This is illustrated in FIG. 5 in connection with research IP 510. The user 510 inherits a role from researcher 506, user 510 inherits a role from researcher 506, so that the role of user 506 is superior to (or a parent of) the role inherited by user 510. In addition, a user 510 inherits a second role from a role of IP lawyer 518, which is thus superior to the second inherited role.

Referring further to FIG. 5, one or more permissions of a role may be assigned to or inherited by a user. As an example of this, FIG. 5 shows a permission assigned from the role of manager 502 to user 504. As a further example, FIG. 5 shows a permission assigned from the role of employee 512 to user 520. The same or a different permission is also assigned from the role of employee 512 to user 522.

It is seen from the role hierarchy of FIG. 5 that the inheritance, or distribution of roles and permissions, creates parent and child relationships or classes. Before taking action to modify or improve restrictions on the role structure, in order to achieve role optimization, these parent and child classes need to be considered.

Figure 6:
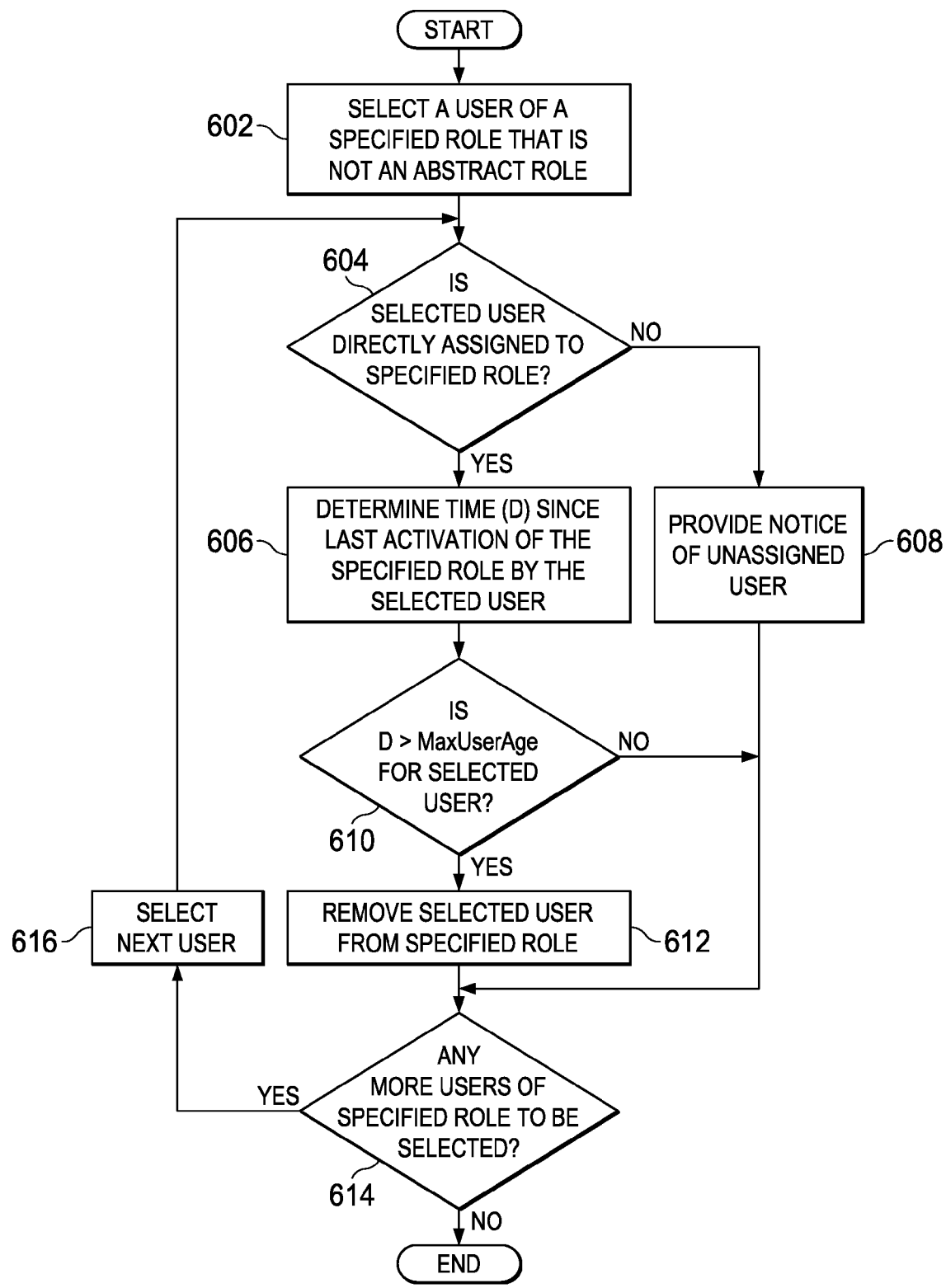
FIG. 6 is a flowchart illustrating a dormant user algorithm that can be implemented in an embodiment of the invention.

Referring to FIG. 6, there is shown a flowchart that illustrates an algorithm which may be used to automatically recognize dormant users of a role, as referred to above in connection with condition (1), and to remove such users from the role. The algorithm of FIG. 6 is intended to automatically remove only users who are directly assigned to the role, and to provide warning or notice of other cases.

At step 602, the user of a specified role is selected, wherein the role is not an abstract role. At decision step 604, it is determined whether the user is or is not directly assigned to the specified role. If the user is directly assigned the algorithm proceeds to step 606, and otherwise goes to step 608.

Step 606 determines the time D since the last activation of the specified role by the selected user. In respective embodiments, D could be a date, or could be a specific date and time. At step 610, the algorithm determines whether or not D is greater than a predetermined period of time of maxUserAge. This is the maximum amount of time during which a user may refrain from using the specified role, without becoming a dormant user. Accordingly, if the determination at step 610 is positive, the algorithm proceeds to step 612, and the selected user is removed from the specified role. The algorithm then goes to step 614.

If the determination at step 610 is negative, the algorithm bypasses step 612, and goes directly step 614. Thus, the selected user remains assigned to the role. At step 614, it is decided whether or not there are any more users of the specified role who should be selected for processing by the algorithm of FIG. 6. If not, the algorithm ends, and otherwise proceeds to step 616. Step 616 selects the next one of such users, and loops back to the input of step 604.

Step 608 provides notice that users are not assigned to the specified role, in response to a negative output of step 604. The output 608 is directed to the input of step 614.

Figure 7:
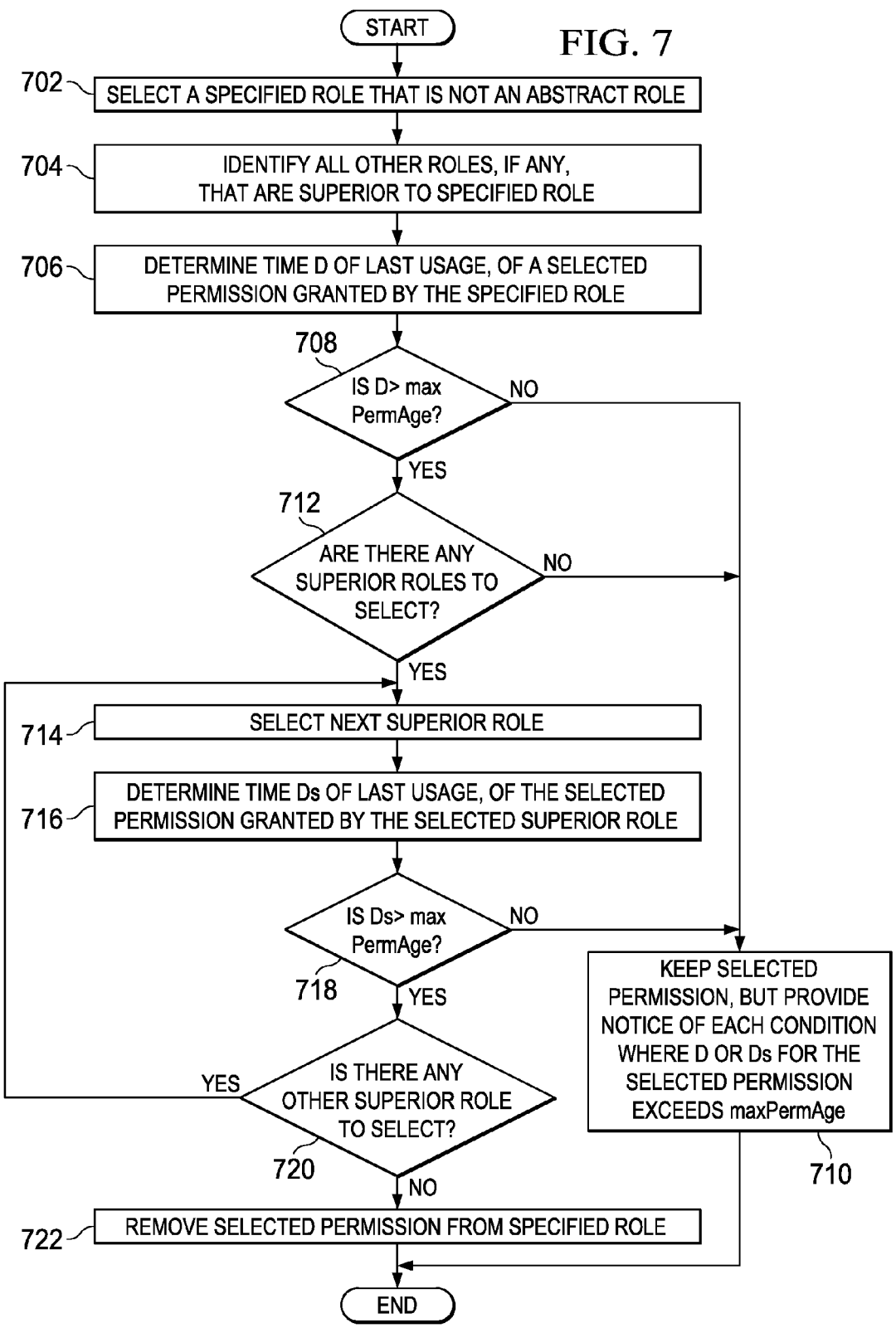
FIG. 7 is a flowchart illustrating an unused permission algorithm that can be implemented in an embodiment of the invention.

Referring to FIG. 7, there is shown a flowchart that illustrates an algorithm which may be used to automatically recognize unused permissions, referred to above in connection with condition (2), and to remove such unused permissions from an associated role. The algorithm of FIG. 7 is intended to automatically remove a permission from a given role that does not use the permission, only if all roles superior to the given role also do not use the permission.

At step 702, a specified role is selected that is not an abstract role. At step 704, all of the roles that are superior to the specified role, such as superior roles as described above, are identified.

Step 706 determines the time D since the last usage, of a selected permission granted by the specified role. In respective embodiments, D could be a date, or could be a specific date and time. At step 708 the algorithm determines whether or not D is greater than a predetermined period of time maxPermAge. This is the maximum time during which a permission can remain unused, without being considered to possibly be superfluous.

If decision step 708 provides a negative result, the last usage time D of the selected permission, in association with the specified role, is within the required time constraint. Accordingly, the algorithm proceeds to step 710, and the selected permission is kept. Step 710 performs a further task, described hereinafter.

If the output of decision step 708 is positive, the last usage D of the selected permission exceeds the required constraint. In this case, the algorithm proceeds to decision step 712, which determines whether there are any roles to select that are superior to the specified role. If not, the algorithm proceeds to step 710, and otherwise goes to step 714 to select one of the superior roles. The algorithm then proceeds to step 716.

Step 716 determines Ds, which is the time since the last usage of the selected permission, wherein the selected permission was granted by the selected superior role. At decision step 718, it is determined whether or not Ds is greater than the time constraint maxPermAge. If the result of decision step 718 is negative, the algorithm proceeds to step 710, and the selected permission step is kept. Such result indicates that the selected permission has been used within the time constraint, for at least one role that is superior to the specified role.

If decision step 718 provides a positive result, the algorithm goes to step 720, which determines whether there are any further superior roles to select and consider. If there are, the algorithm returns to the input of step 714, and selects the next superior role. The process of FIG. 7 then continues, until a negative output is provided by either step 710 or step 720.

It is to be appreciated that the output of step 720 will become negative, only if all last usage values D and Ds of the selected permission exceed the constraint maxPermAge. This situation indicates that the selected permission has been unused during the required time for both the specified role and all roles superior thereto. Accordingly, the algorithm proceeds to step 722, and the selected permission is removed from the specified role.

In addition to retaining the selected permission, step 710 also provides notice of each condition were D and Ds for the selected permission exceeds the constraint maxPermAge.

While not shown, the algorithm of FIG. 7 could be readily adapted to iteratively process each of multiple permissions, that are all granted by the specified role.

Figure 8:
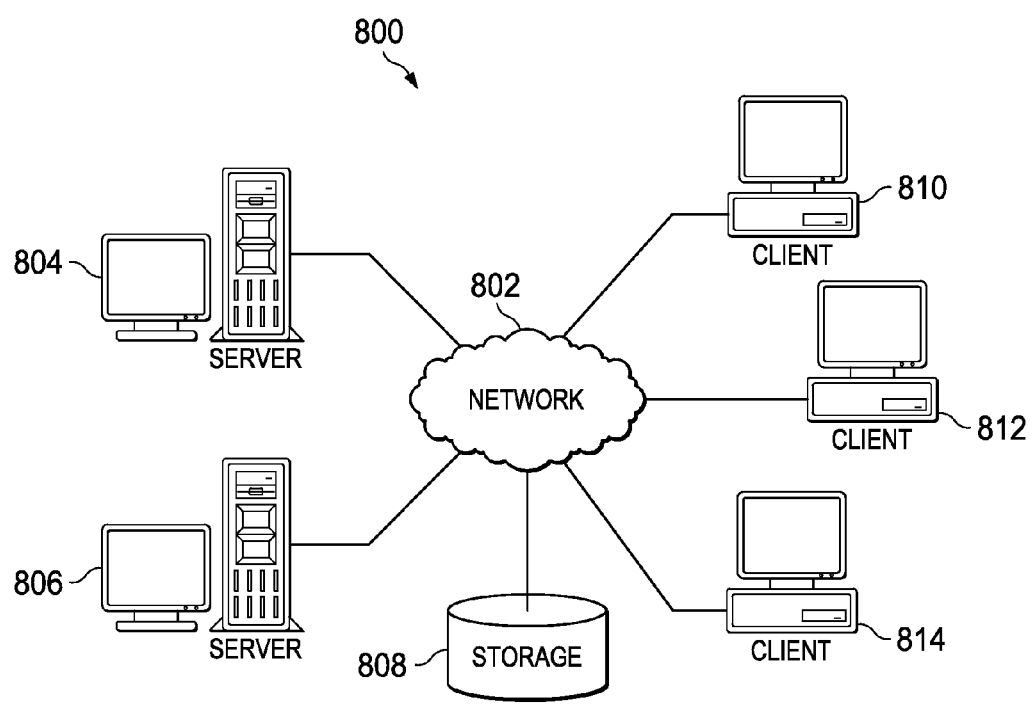
FIG. 8 is a block diagram showing a network of data processing systems in which an embodiment of the invention may be implemented.

FIG. 8 is a pictorial representation of a network of data processing systems in which illustrative embodiments of the invention may be implemented. Network data processing system 800 is a network of computers in which the illustrative embodiments may be implemented. Network data processing system 800 contains network 802, which is the medium used to provide communications links between various devices and computers connected together within network data processing system 800. Network 802 may include connections, such as wire, wireless communication links, or fiber optic cables.

In the depicted example, server computer 804 and server computer 806 connect to network 802 along with storage unit 808. In addition, client computers 810, 812, and 814 connect to network 802. Client computers 810, 812, and 814 may be, for example, personal computers or network computers. In the depicted example, server computer 804 provides information, such as boot files, operating system images, and applications to client computers 810, 812, and 814. Client computers 810, 812, and 814 are clients to server computer 804 in this example. Network data processing system 800 may include additional server computers, client computers, and other devices not shown.

Program code located in network data processing system 800 may be stored on a computer-recordable storage medium and downloaded to a data processing system or other device for use. For example, program code may be stored on a computer-recordable storage medium on server computer 804 and downloaded to client computer 810 over network 802 for use on client computer 810.

In the depicted example, network data processing system 800 is the Internet with network 802 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational and other computer systems that route data and messages. Of course, network data processing system 800 also may be implemented as a number of different types of networks, such as, for example, an intranet, a local area network (LAN), or a wide area network (WAN). FIG. 8 is intended as an example, and not as an architectural limitation for the different illustrative embodiments.

Turning now to FIG. 9, an illustration of a data processing system is depicted in accordance with an illustrative embodiment. The data processing system may be used as one or more of the components for system 800. In this illustrative example, data processing system 900 includes communications fabric 902, which provides communications between processor unit 904, memory 906, persistent storage 908, communications unit 910, input/output (I/O) unit 912, and display 914.

Processor unit 904 serves to execute instructions for software that may be loaded into memory 906. Processor unit 904 may be a number of processors, a multi-processor core, or some other type of processor, depending on the particular implementation. A number, as used herein with reference to an item, means one or more items. Further, processor unit 904 may be implemented using a number of heterogeneous processor systems in which a main processor is present with secondary processors on a single chip. As another illustrative example, processor unit 904 may be a symmetric multi-processor system containing multiple processors of the same type.

Memory 906 and persistent storage 908 are examples of storage devices 916. A storage device is any piece of hardware that is capable of storing information, such as, for example, without limitation, data, program code in functional form, and/or other suitable information either on a temporary basis and/or a permanent basis. Storage devices 916 may also be referred to as computer-readable storage devices in these examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these examples, provides for communications with other data processing systems or devices. In these examples, communications unit 910 is a network interface card. Communications unit 910 may provide communications through the use of either or both physical and wireless communications links.

Input/output unit 912 allows for input and output of data with other devices that may be connected to data processing system 900. For example, input/output unit 912 may provide a connection for user input through a keyboard, a mouse, and/or some other suitable input device. Further, input/output unit 912 may send output to a printer. Display 914 provides a mechanism to display information to a user.

Instructions for the operating system, applications, and/or programs may be located in storage devices 916, which are in communication with processor unit 904 through communications fabric 902. In these illustrative examples, the instructions are in a functional form on persistent storage 908. These instructions may be loaded into memory 906 for execution by processor unit 904. The processes of the different embodiments may be performed by processor unit 904 using computer implemented instructions, which may be located in a memory, such as memory 906.

These instructions are referred to as program code, computer-usable program code, or computer-readable program code that may be read and executed by a processor in processor unit 904. The program code in the different embodiments may be embodied on different physical or computer-readable storage media, such as memory 906 or persistent storage 908.

Program code 918 is located in a functional form on computer-readable media 920 that is selectively removable and may be loaded onto or transferred to data processing system 900 for execution by processor unit 904. Program code 918 and computer-readable media 920 form computer program product 922 in these examples. In one example, computer-readable media 920 may be computer-readable storage media 924. Computer-readable storage media 924 may include, for example, an optical or magnetic disk that is inserted or placed into a drive or other device that is part of persistent storage 908 for transfer onto a storage device, such as a hard drive, that is part of persistent storage 908. Computer-readable storage media 924 also may take the form of a persistent storage, such as a hard drive, a thumb drive, or a flash memory, that is connected to data processing system 900. In some instances, computer-readable storage media 924 may not be removable from data processing system 900.

The different components illustrated for data processing system 900 are not meant to provide architectural limitations to the manner in which different embodiments may be implemented. The different illustrative embodiments may be implemented in a data processing system including components in addition to or in place of those illustrated for data processing system 900. Other components shown in FIG. 9 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 904 may take the form of a hardware unit that has circuits that are manufactured or configured for a particular use. This type of hardware may perform operations without needing program code to be loaded into a memory from a storage device to be configured to perform the operations.

For example, when processor unit 904 takes the form of a hardware unit, processor unit 904 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 918 may be omitted because the processes for the different embodiments are implemented in a hardware unit.

In still another illustrative example, processor unit 904 may be implemented using a combination of processors found in computers and hardware units. Processor unit 904 may have a number of hardware units and a number of processors that are configured to run program code 918. With this depicted example, some of the processes may be implemented in the number of hardware units, while other processes may be implemented in the number of processors.

As another example, a storage device in data processing system 900 is any hardware apparatus that may store data. Memory 906, persistent storage 908, and computer-readable media 920 are examples of storage devices in a tangible form.

In another example, a bus system may be used to implement communications fabric 902 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 906, or a cache, such as found in an interface and memory controller hub that may be present in communications fabric 902.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. In association with a computer system wherein a specified role controls user access, the specified role comprises one or more users and one or more permissions, and a set of prespecified rules pertains to the specified role, a computer implemented method comprising the steps of:

recording, by a processor unit of the computer system, access data pertaining to each of a succession of access events in an access log, wherein each event comprises an instance of the computer system being accessed by a particular user;

analyzing, by the processor unit, recorded data contained in the access log at selected time intervals, in order to detect one of a plurality of prespecified conditions including the prespecified condition of the specified user is a dormant user;

responsive to detecting a prespecified condition, selectively determining, by the processor unit, whether any change to the users or to the permissions of the specified role is needed; and implementing, by the processor unit, each needed change to the users, including removing the specified user from the specified role when the prespecified condition of the specified user is the dormant user, or to the permissions.

2. The method of claim 1, wherein:

the specified role is one of multiple roles that are respectively provided to control access to the computer system, wherein each role is provided in accordance with a role based access control (RBAC) policy.

3. The method of claim 1, wherein:

the specified access data includes information showing that the time since the last activation of the specified role by the specified user is greater than a predetermined time limit.

4. The method of claim 1, wherein:

responsive to analyzing specified access data contained in the access log that pertains to a specified permission granted by the specified role, detecting a condition that the time since the last use of the specified permission, in association with the specified role, is greater than a predetermined time limit, whereupon the specified permission is removed from the specified role.

5. The method of claim 3, wherein:

the specified permission is granted by one or more roles that are each superior to the specified role, the specified access data is used to compute, for each superior role, the time since the last use of the specified permission granted by that superior role, and it is determined that the computed times for all of the superior roles are respectively greater than the predetermined time limit.

6. The method of claim 1, wherein:
responsive to analyzing access data contained in the access log, and detecting a condition that the time since any user has activated the specified role exceeds a predetermined time limit, the specified role is discontinued.

7. The method of claim 1, wherein:
recorded data contained in the access log is analyzed to detect a condition selected from a group consisting of role size, role risk, role concurrency, permission-based separation of duties, and overlapping roles.

8. The method of claim 7, wherein:
responsive to detecting a condition of role risk, permissions determined to be of a high sensitivity are placed in a role different from a role containing permissions that are determined to be of a low sensitivity.

9. The method of claim 7, wherein:
analyzing recorded data contained in the access log includes operating a role monitoring component that is provided with a data access layer having a query interface and an event flow interface.

10. The method of claim 9, wherein:
one or more analysis modules are each plugged into the data access layer, to support analysis for a selected corresponding condition.

11. The method of claim 10, wherein:
events recorded in the access log are respectively played back through an event analysis module, to detect one or more specified types of conditions.

12. The method of claim 10, wherein:
a different analysis module is provided for use in detecting each of a plurality of prespecified conditions, including at least superfluous permissions, dormant users, and role concurrency.

13. The method of claim 1, wherein:
the selected time intervals comprise periodic time intervals or aperiodic time intervals, selectively.

14. The method of claim 1, wherein:
the specified role enables a user to access each one of multiple computer systems.

* * * * *